US009225075B2

(12) United States Patent
Kawasaki et al.

(10) Patent No.: US 9,225,075 B2
(45) Date of Patent: Dec. 29, 2015

(54) HIGH VOLTAGE DEVICE SYSTEM OF RAILCAR AND RAILCAR

(75) Inventors: Hiroyuki Kawasaki, Takasago (JP); Hiroyuki Sakurai, Akashi (JP); Ryoji Negi, Kobe (JP); Shin Imanishi, Tokyo (JP); Nobuyuki Sema, Tokyo (JP)

(73) Assignees: KAWASAKI JUKOGYO KABUSHIKI KAISHA, Kobe (JP); SWCC SHOWA CABLE SYSTEMS CO., LTD., Tokyo (JP)

( * ) Notice: Subject to any disclaimer, the term of this patent is extended or adjusted under 35 U.S.C. 154(b) by 242 days.

(21) Appl. No.: 13/979,036

(22) PCT Filed: Nov. 15, 2011

(86) PCT No.: PCT/JP2011/006353
§ 371 (c)(1),
(2), (4) Date: Sep. 18, 2013

(87) PCT Pub. No.: WO2012/095916
PCT Pub. Date: Jul. 19, 2012

(65) Prior Publication Data
US 2014/0008169 A1  Jan. 9, 2014

(30) Foreign Application Priority Data

Jan. 14, 2011  (JP) .................................. 2011-006073

(51) Int. Cl.
*H01R 4/00* (2006.01)
*H02G 15/08* (2006.01)
(Continued)

(52) U.S. Cl.
CPC ... *H01R 4/00* (2013.01); *B60L 5/24* (2013.01); *B61G 5/10* (2013.01); *H02G 15/08* (2013.01); *B60L 2200/26* (2013.01)

(58) Field of Classification Search
CPC ............ B61G 5/10; B60D 1/64; H02G 15/08; B60L 5/24; H01R 4/00
See application file for complete search history.

(56) References Cited

U.S. PATENT DOCUMENTS 3,590,138 A * 6/1971 Sugimoto et al. ............ 174/72 R
4,210,381 A * 7/1980 Borgstrom .................... 439/161
(Continued)

FOREIGN PATENT DOCUMENTS

JP  A-58-006027  1/1983
JP  A-06-070442  3/1994
(Continued)

OTHER PUBLICATIONS

Extended European Search Report issued in European Application No. 11855893.1 issued May 22, 2014.
(Continued)

*Primary Examiner* — Zachary Kuhfuss
(74) *Attorney, Agent, or Firm* — Oliff PLC

(57) ABSTRACT

The present invention is a high voltage device system mounted on a railcar and includes a plurality of high voltage devices to which high-voltage electric power from an overhead contact line is supplied, a plurality of high-voltage cables configured to connect the high voltage devices with each other, and a joint device to which the high-voltage cables are connected. The high-voltage cables respectively include cable connector portions at tip end portions thereof, and each of the cable connector portions includes a base tubular portion configured to cover the high-voltage cable and a fit tubular portion extending from the base tubular portion in a direction substantially perpendicular to a longitudinal direction of the high-voltage cable. The joint device includes joint connector portions, each of which is fitted to the fit tubular portion of the cable connector portion to be connected to the high-voltage cable.

11 Claims, 4 Drawing Sheets

(51) Int. Cl.
*B61G 5/10* (2006.01)
*B60L 5/24* (2006.01)

(56) References Cited

U.S. PATENT DOCUMENTS

| | | | |
|---|---|---|---|
| 5,573,410 A | 11/1996 | Stepniak | |
| 6,371,265 B1* | 4/2002 | Arrouy et al. | 191/2 |
| 6,959,825 B2* | 11/2005 | Uneme et al. | 213/1.3 |
| 7,234,980 B2* | 6/2007 | Jazowski et al. | 439/801 |
| 7,878,849 B2* | 2/2011 | Hughes et al. | 439/578 |
| 7,958,631 B2* | 6/2011 | Hughes et al. | 29/857 |
| 8,511,449 B2* | 8/2013 | Kumar | 191/4 |
| 2007/0093112 A1 | 4/2007 | Macey | |
| 2009/0042436 A1* | 2/2009 | Emoto et al. | 439/502 |
| 2013/0203289 A1* | 8/2013 | Ota et al. | 439/607.01 |
| 2014/0020999 A1* | 1/2014 | Kawasaki et al. | 191/50 |

FOREIGN PATENT DOCUMENTS

| | | |
|---|---|---|
| JP | A-08-310394 | 11/1996 |
| JP | A-09-308075 | 11/1997 |
| JP | A-11-289601 | 10/1999 |
| JP | A-2001-008351 | 1/2001 |
| JP | A-2001-177975 | 6/2001 |
| JP | A-2004-096929 | 3/2004 |
| JP | A-2005-332603 | 12/2005 |
| JP | A-2009-136142 | 6/2009 |

OTHER PUBLICATIONS

Dec. 27, 2011 International Search Report issued in International Application No. PCT/JP2011/006353.

* cited by examiner

US 9,225,075 B2

HIGH VOLTAGE DEVICE SYSTEM OF RAILCAR AND RAILCAR

TECHNICAL FIELD

The present invention relates to a high voltage device system mounted on a railcar and a railcar including the high voltage device system.

BACKGROUND ART

To receive high-voltage electric power through an overhead contact line and supply the electric power to respective devices of a railcar, the railcar includes on an upstream side a plurality of high voltage devices, such as a power collector (pantograph), a vacuum circuit breaker (VCB), a lightning arrester (arrester), and a transformer. Then, a high voltage device system is constituted by these high voltage devices, high-voltage cables interposed among the high voltage devices, a joint device configured to connect the high-voltage cables with one another, and the like.

As conventional joint devices, two types that are a straight joint device and a Y branch joint device are known. The straight joint device connects two high-voltage cables with each other in a straight manner whereas the Y branch joint device connects three high-voltage cables with one another.

FIG. 7 shows the vicinity of a power collector arranged on a roof of a railcar and using a Y branch joint device. In FIG. 7, a collector shoe and arm portion of the power collector are omitted. Two high-voltage cables 270 respectively extend from front and rear sides of a power collector 230 in a railcar longitudinal direction. One of the high-voltage cables 270 is connected to a vacuum circuit breaker arranged under a floor of a car, and the other high-voltage cable 270 is connected to a receiving opening 252a of a Y branch joint device 252. In the Y branch joint device 252, the high-voltage cable 270 branches into two cables. One of the two cables is connected to a receiving opening 252b of the Y branch joint device 252 and extends toward a front-side car, and the other cable is connected to a receiving opening 252c of the Y branch joint device 252 and extends toward a rear-side car. Thus, the electric power is supplied to the respective ears.

In a case where the high-voltage cable 270 is connected to the Y branch joint device 252, a so-called prefabricated joint (see PTL 2) is adopted in the high voltage device system of the railcar, the prefabricated joint being configured such that: a rubber stress-relief cone (not shown) arranged at a terminal of the high-voltage cable 270 is inserted into the receiving opening of the Y branch joint device 252 which is made of epoxy resin and the like and in which an internal conductor (not shown) is embedded; and the stress-relief cone is pressed against the receiving opening by a compression unit (not shown).

PTL 1 discloses an electric power cable connecting device using a conventional joint device. FIG. 2 of PTL 1 discloses a configuration corresponding to a straight joint device to which the prefabricated joint is applied and which is for use in the railcars.

PTL 2 discloses a prefabricated joint. FIGS. 6 and 8 of PTL 2 disclose a configuration corresponding to a Y branch joint device to which the prefabricated joint is applied.

CITATION LIST

Patent Literature

PTL 1: Japanese Laid-Open Patent Application Publication No. 6-70442

PTL 2: Japanese Laid-Open Patent Application Publication No. 2001-177975

SUMMARY OF INVENTION

Technical Problem

The following will explain in detail a conventional method of inserting a tip end of the high-voltage cable into a joint device to which the prefabricated joint is applied. FIGS. 8A to 8C are diagrams showing a connecting method using a conventional joint device. To be specific, in a case where the terminal of the high-voltage cable 270 is inserted into the receiving opening 252c of the Y branch joint device 252 to which the prefabricated joint is applied as shown in FIG. 8A, the stress-relief cone and so on attached to the terminal of the high-voltage cable 270 that has been stripped stepwise in advance needs to be inserted into the receiving opening 252c. Therefore, before inserting the high-voltage cable 270, the high-voltage cable 270 is bent once as shown in FIG. 8B to be pulled back in a longitudinal direction, and then is coupled to the Y branch joint device 252 as shown in FIG. 8C. However, the high-voltage cable used in the high voltage device system of the railcar is extremely large in diameter, that is, about 50 to 60 mm or more in diameter, and is extremely hard. Therefore, the work of pulling back the high-voltage cable in the longitudinal direction as shown in FIG. 8B is not easy, and the efficiency of the work is not good.

Further, in a case where the high-voltage cable is short, the high-voltage cable cannot be coupled to the joint device. Therefore, as shown in FIG. 7, in a case where the power collector 230 and the Y branch joint device 252 are arranged close to each other, a portion, connected to the power collector 230, of the high-voltage cable 270 that connects the power collector 230 and the Y branch joint device 252 is arranged away from the Y branch joint device 252. To be specific, the length of the high-voltage cable 270 that connects the power collector 230 and the Y branch joint device 252 is intentionally increased as the countermeasure (in FIG. 7, the high-voltage cable 270 is arranged so as to U-turn). In this configuration, since the high-voltage cable increases in length, one disadvantage is that the railcar increases in weight as a whole, and another disadvantage is that a space for arranging the respective high voltage devices further decreases.

The present invention was made to solve the above problems, and an object of the present invention is to provide a high voltage device system of a railcar, the high voltage device system being capable of efficiently connecting a high-voltage cable to a joint device even at a limited space, such as a space on a roof of a railcar.

Solution to Problem

The present invention was made to solve the above problems, and a high voltage device system of a railcar according to the present invention is a high voltage device system mounted on a railcar, the high voltage device system including: a plurality of high voltage devices to which high-voltage electric power from an overhead contact line is supplied; a plurality of high-voltage cables configured to connect the high voltage devices with one another; and a joint device to which the high-voltage cables are connected, wherein: the high-voltage cables respectively include cable connector portions at tip end portions thereof, each of the cable connector portions including a base tubular portion configured to cover the high-voltage cable and a fit tubular portion extending from the base tubular portion in a direction substantially perpendicular to a longitudinal direction of the high-voltage cable; and the joint device includes joint connector portions, each of which is fitted to the fit tubular portion of the cable connector portion to be connected to the high-voltage cable.

According to the above configuration, the high-voltage cable can be attached to the joint device by fitting the cable connector portion to the joint connector portion in a direction substantially perpendicular to a longitudinal direction of the high-voltage cable. Therefore, without performing the work of pulling back the high-voltage cable in the longitudinal direction as in the case of the prefabricated joint, the high-voltage cable can be connected to the joint device.

Advantageous Effects of Invention

According to the high voltage device system of the railcar of the present invention, the high-voltage cable can be connected to the joint device without performing the work of pulling back the high-voltage cable in the longitudinal direction. Therefore, the high-voltage cable can be efficiently connected to the joint device even in a limited space, such as a space on the roof of the railcar.

DESCRIPTION OF EMBODIMENTS

Hereinafter, an embodiment of a high voltage device system of a railcar according to the present invention will be explained in reference to the drawings. In the following explanation and the drawings, the same reference signs are used for the same or corresponding components, and a repetition of the same explanation is avoided.

Configuration of Railcar

Figure 1:
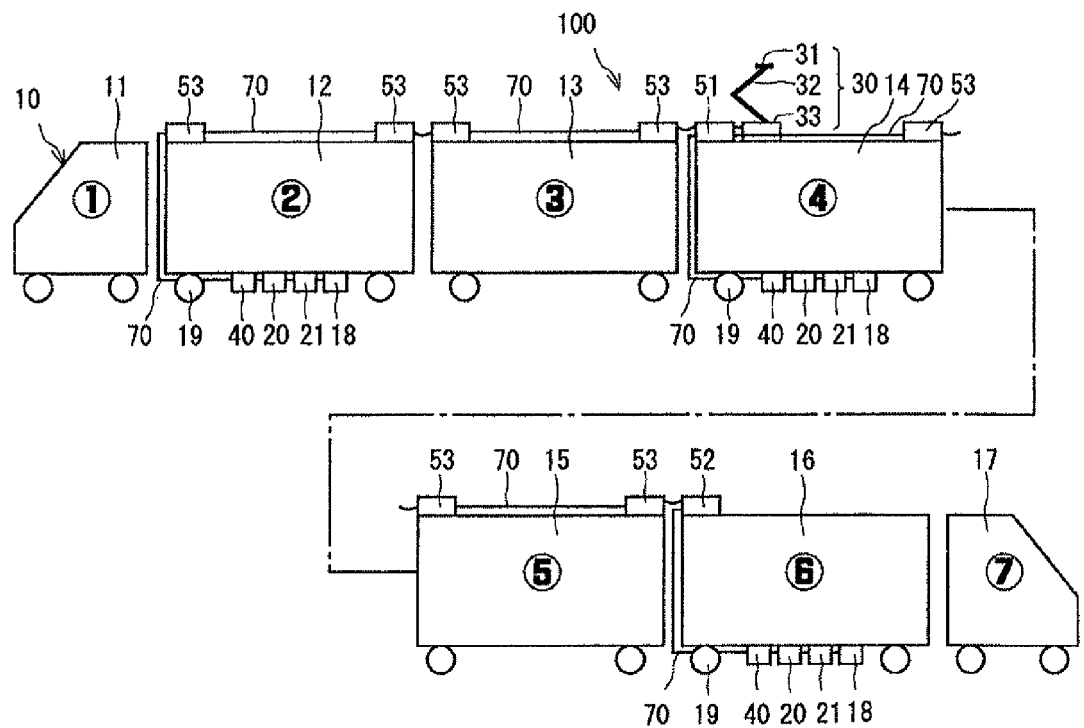
FIG. 1 is a schematic side view showing a high voltage device system and railcar according to an embodiment of the present invention.

The configuration of a railcar 10 on which a high voltage device system 100 according to the present embodiment is mounted will be explained in reference to FIG. 1. FIG. 1 is a schematic side view showing the high voltage device system 100 and railcar 10 according to the present embodiment. The railcar 10 of the present embodiment includes a total of seven cars that are a first car 11, a second car 12, ..., and a seventh car 17 as shown in this order from the left in FIG. 1. The railcar 10 can travel in both left and right directions in FIG. 1. Each of the first ear 11 and the seventh car 17 may be used as a front car. In the following explanation, for convenience sake, the left side in FIG. 1 corresponds to a proceeding direction, that is, the first car 11 is the front car. Further, in the following explanation, the "right" denotes a right-hand side when facing in the proceeding direction, the "left" denotes a left-hand side when facing in the proceeding direction, the "front" denotes a front side when facing in the proceeding direction, and the "rear" denotes a rear side when facing in the proceeding direction.

In the railcar 10 of the present embodiment, motors 18 are respectively mounted on the second car 12, the fourth car 14, and the sixth car 16, and a power collector 30 is mounted on the fourth car 14.

The power collector 30 receives a 25,000V (volt) AC (alternate current) electric power through an overhead contact line. The electric power flows through a plurality of high-voltage cables 70, is, for example, transformed, and is then supplied to the motors 18 mounted on the second car 12, the fourth car 14, and the sixth car 16. With this, the respective motors 18 drive to rotate drive wheels 19, so that the railcar 10 can travel. In the present embodiment, the voltage supplied through the overhead contact lines is 25,000V AC. However, the present embodiment is not limited to this, and is applicable to any electrification systems adopted at respective regions.

Each of the cars 11 to 17 includes bogies arranged under a floor of the car and configured to support a carbody. In FIG. 1, only the wheels are simply shown, and the bogies (underframes) are not shown. However, as can be understood from the wheels shown, the bogies are actually, respectively arranged at front and rear portions of each of the cars 11 to 17. The structure of the bogie is not especially limited, but the bogie of the present embodiment is configured such that at least a center thereof supports the carbody.

High Voltage Device System

Next, the configuration of the high voltage device system 100 according to the present embodiment will be explained in reference to FIGS. 1 to 4. As shown in FIG. 1, the high voltage device system 100 of the present embodiment includes a plurality of high voltage devices to which high-voltage electric power is supplied through the overhead contact line. As shown in FIG. 1, the high voltage device system 100 according to the present embodiment includes the power collector 30, breakers 40, and transformers 20 as the high voltage devices and further includes joint devices 51 to 53 and high-voltage cables 70. The power collector 30 and the joint devices 51 to 53 are arranged on a roof of the railcar 10, and the breakers 40 and the transformers 20 are arranged under a floor of the railcar 10. Hereinafter, these components will be explained in order.

The power collector 30 is a high voltage device configured to collect high-voltage electric power through the overhead contact line. As described above, in the present embodiment, the power collector 30 is mounted only on the fourth car 14. The power collector 30 is mounted at a front portion on the roof of the fourth car 14. As above, the power collector is generally located at a front portion or rear portion on a roof of a car. To be specific, the power collector 30 is provided at a position above the center of the bogie, that is, a position where the change in position relative to the overhead contact line becomes minimum. The power collector 30 of the present embodiment is a so-called pantograph and is mainly constituted by a collector shoe 31 contacting the overhead contact line, an arm portion 32 configured to move the collector shoe 31 upward and downward, a supporting member 33 configured to support the arm portion 32, and column portions 34 respectively provided on left and right sides of the supporting member 33 (see FIG. 6).

Each of the breakers 40 is a high voltage device configured to cut off a high current to prevent devices from being damaged when the high current flows through the respective devices and cables. To be specific, the breaker 40 is a high voltage device configured to break a circuit if a predetermined current or a current higher than the predetermined current flows from the power collector 30. To secure its function, the breaker 40 is provided upstream of the devices, such as the motor 18 (in fact, the breaker 40 is provided between the power collector 30 and the transformer 20). In the present embodiment, the breakers 40 are respectively mounted on the second car 12, the fourth car 14, and the sixth car 16, on each of which the transformer 20 configured to transform the voltage of the current having flowed through the breaker 40 is mounted. In the present embodiment, to suppress the influences by air resistance during traveling, the breakers 40 are respectively arranged under the floors of the cars 12, 14, and 16. The breakers 40 may be respectively arranged on the roofs of the cars 12, 14, and 16. In the present embodiment, the breaker 40 is a vacuum circuit breaker (VCB). However, the type and the like of the breaker is not especially limited, and an air blast breaker (ABB) or the like may be used. The current having flowed through the breaker 40 flows through the transformer 20, so that the voltage thereof is reduced to a predetermined voltage value. Then, the frequency of the current is converted by a main converter 21, and the current flows to the motor 18.

The joint devices 51 to 53 are devices configured to connect the high-voltage cables 70 with one another. In the high voltage device system 100 according to the present embodiment, three types of joint devices that are an X branch joint device 51, a Y branch joint device 52, and a straight joint device 53 are used. The configurations of the respective joint devices 51 to 53 are as follows.

Figure 2:
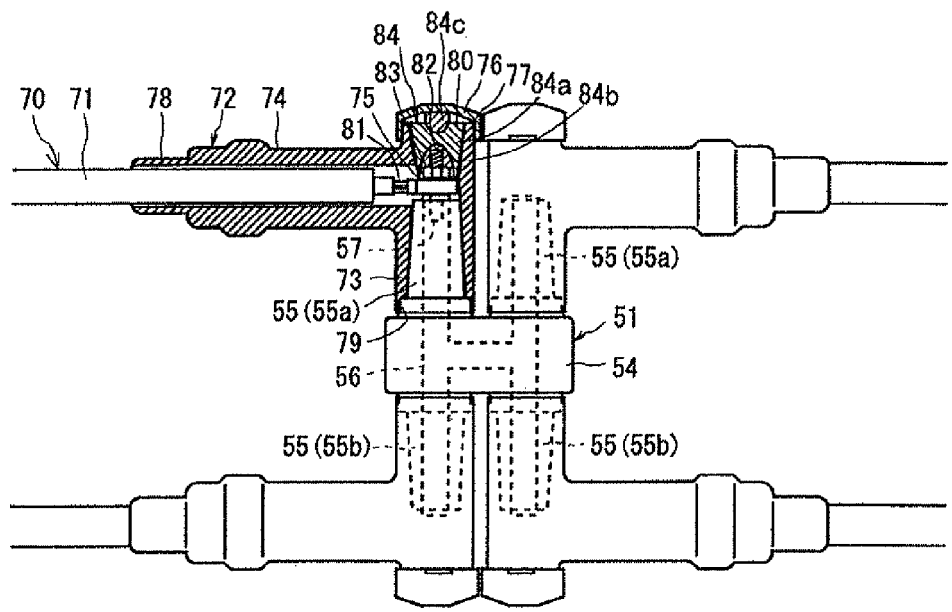
FIG. 2 is a partially cross-sectional plan view of an X branch joint device according to the embodiment of the present invention.

The X branch joint device 51 is a device to which four high-voltage cables can be connected and by which the electric power supplied through one high-voltage cable can be supplied to the other three high-voltage cables. As shown in FIG. 1, the X branch joint device 51 is located on the roof of the fourth car 14 and on the front side of the power collector 30. Here, FIG. 2 is a partially cross-sectional plan view showing the X branch joint device 51 according to the present embodiment. The left side in FIG. 2 is the front side, the right side in FIG. 2 is the rear side, the upper side in FIG. 2 is the right side, and the lower side in FIG. 2 is the left side (the same is true in FIGS. 3, 4, and 6). As shown in FIG. 2, the X branch joint device 51 is mainly constituted by a base portion 54 located at the center thereof, four joint connector portions 55 each formed in a convex shape, and an H-shaped internal conductor portion 56 embedded therein. Each of the joint connector portions 55 has a tapered columnar shape, and a below-described cable connector portion 72 is fitted to the joint connector portion 55. The four joint connector portions 55 are two first joint connector portions 55a and two second joint connector portions 55b. Each of the first joint connector portions 55a projects from the base portion 54 toward one side (right side) in a railcar width direction, and each of the second joint connector portions 55b projects from the base portion 54 toward the other side (left side) in the railcar width direction. The first joint connector portions 55a are lined up in a front-rear direction, and the second joint connector portions 55b are lined up in the front-rear direction. The internal conductor portion 56 is exposed from tip ends of the joint connector portions 55, and internal threads 57 are respectively formed at exposed tip end portions of the internal conductor portion 56.

Figure 3:
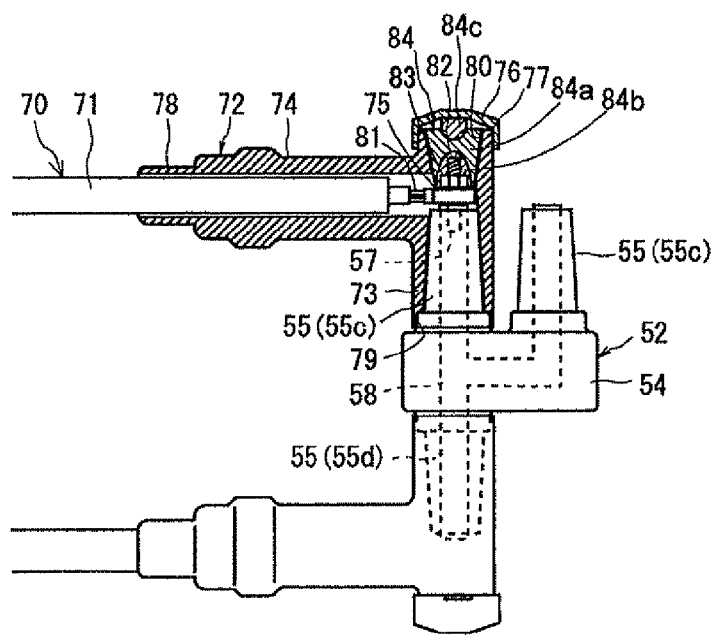
FIG. 3 is a partially cross-sectional plan view of a Y branch joint device according to the embodiment of the present invention.

The Y branch joint device 52 is a device to which three high-voltage cables 70 can be connected and by which the electric power supplied through one high-voltage cable can be supplied to the other two high-voltage cables. As shown in FIG. 1, the Y branch joint device 52 is arranged at the front portion on the roof of the sixth car 16. Here, FIG. 3 is a partially cross-sectional plan view showing the Y branch joint device 52 according to the present embodiment. As shown in FIG. 3, the Y branch joint device 52 is mainly constituted by the base portion 54 located at the center thereof, three joint connector portions 55 each formed in a convex shape, and an internal conductor portion 58 embedded therein. Each of the joint connector portions 55 has a tapered columnar shape, and the below-described cable connector portion 72 is fitted to the joint connector portion 55. The three joint connector portions 55 are two third joint connector portions 55c and one fourth joint connector portion 55d. The third joint connector portions 55c project from the base portion 54 toward one side (right side) in the railcar width direction and are respectively arranged at front and rear sides in the railcar longitudinal direction. One fourth joint connector portion 55d projects from the base portion 54 toward the other side (left side) in the railcar width direction. The Y branch joint device 52 of the present embodiment is configured such that two joint connector portions 55 (third joint connector portions 55c) project on the right side, and one joint connector portion 55 (fourth joint connector portion 55d) projects on the left side. However, on the contrary, the Y branch joint device 52 may be configured such that one joint connector portion 55 projects on the right side, and two joint connector portions 55 project on the left side. The internal conductor portion 58 is exposed from tip ends of the joint connector portions 55, and the internal threads 57 are respectively formed at exposed tip end portions of the internal conductor portion 58.

Figure 4:
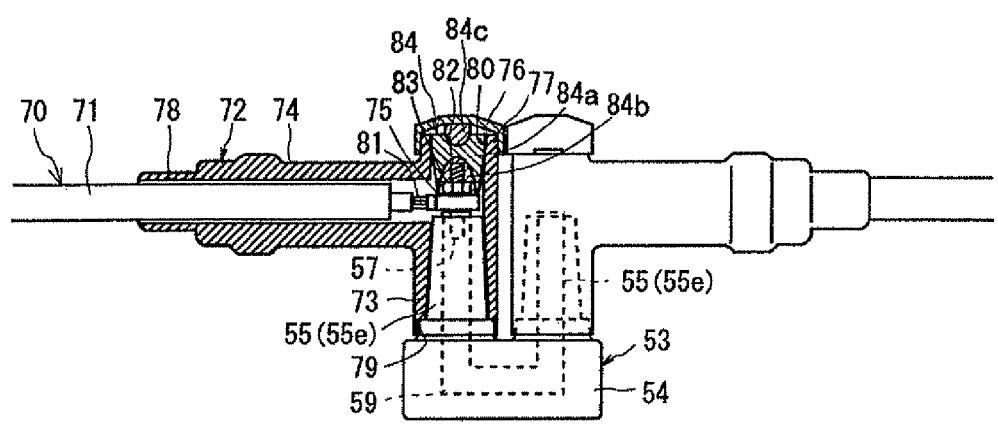
FIG. 4 is a partially cross-sectional plan view of a straight joint device according to the embodiment of the present invention.

The straight joint device 53 is a device capable of connecting two high-voltage cables 70 in a straight manner. As shown in FIG. 1, the straight joint devices 53 are respectively arranged at both the front and rear portions on the roofs of the second car 12, the third car 13, and the fifth car 15 and at the rear portion on the roof of the fourth car 14. Here, FIG. 4 is a partially cross-sectional plan view showing the straight joint device 53 according to the present embodiment. As shown in FIG. 4, the straight joint device 53 is mainly constituted by the base portion 54, two joint connector portions 55 (fifth joint connector portions 55e) each formed in a convex shape, and a U-shaped internal conductor portion 59 embedded therein. Each of the joint connector portions 55 has a tapered columnar shape, and the below-described cable connector portion 72 is fitted to the joint connector portion 55. The two fifth joint connector portions 55e project from the base portion 54 toward one side (right side) in the railcar width direction and are lined up in the front-rear direction. In the straight joint device 53 of the present embodiment, the two fifth joint connector portions 55e project from the base portion 54 toward the right side. However, the direction of the projection is not especially limited. For example, the two joint connector portions 55 may project from the base portion 54 toward the left side or the upper side. The internal conductor portion 59 is exposed from the tip ends of the joint connector portions 55, and the internal screws 57 are respectively formed at exposed tip end portions of the internal conductor portion 59. The foregoing has explained the configurations of the joint devices 51 to 53. Next, the other components will be explained.

The high-voltage cable 70 is a member configured to connect the high voltage devices with each other and transmit a high-voltage current. As shown in FIGS. 2 to 4, the high-voltage cable 70 is mainly constituted by a cable main body 71 and the cable connector portion 72 provided at a tip end portion of the cable main body 71. The outer diameter of the cable main body 71 of the high-voltage cable 70 used in the high voltage device system 100 of the railcar 10 is about 50 to 60 mm, and the high-voltage cable 70 is extremely hard. Therefore, the high-voltage cable 70 is difficult to bend with a small bending radius. The cable connector portion 72 includes a concave accommodating portion 73 in which the joint connector portion 55 can be accommodated.

The cable connector portion 72 will be more specifically explained. The cable connector portion 72 is mainly constituted by a housing portion 74, a connecting terminal 75, a cap portion 76, and an insulating plug 84. The housing portion 74 includes a cylindrical fit tubular portion 77 and a cylindrical base tubular portion 78 which extends from a side surface of the fit tubular portion 77 in a direction perpendicular to the fit tubular portion 77 and is coupled to the fit tubular portion 77 such that the inside thereof communicates with the inside of the fit tubular portion 77. The housing portion 74 has a T shape as a whole. One end of the fit tubular portion 77 is a connector opening portion 79 into which the joint connector portion 55 is inserted. The accommodating portion 73 having a concave shape is formed by the connector opening portion 79 and its vicinity. The other end of the fit tubular portion 77 is a work opening portion 80 used to perform a below-described connecting work. Further, the cable main body 71 having the tip end portion that has been stripped stepwise in advance is inserted through the base tubular portion 78 toward the inside of the housing portion 74, and the connecting terminal 75 is attached to the tip end of the cable main body 71. The housing portion 74 is made of an elastic insulating material, such as ethylene propylene rubber (EP rubber) or silicone rubber. Although not shown, an inner semi-conducting layer is formed on an inner peripheral side of a central portion of the housing portion 74 such that the inner semi-conducting layer covers the vicinity of the connecting terminal 75 and an inner peripheral side of the inner semi-conducting layer is exposed, and an outer semi-conducting layer is formed on an outer periphery of the housing portion 74. The inner semi-conducting layer and the outer semi-conducting layer are formed integrally with the housing portion 74, and the configurations of these layers are known to those skilled in the art (see Japanese Laid-Open Patent Application Publication No. 9-308075 and Japanese Laid-Open Patent Application Publication No. 2004-96929, for example). The inner semi-conducting layer is made of semi-conducting ethylene propylene rubber (EP rubber) or semi-conducting silicone rubber, and the external semi-conducting layer is made of semi-conducting or conducting paint, semi-conducting ethylene propylene rubber (EP rubber), or semi-conducting silicone rubber. The connecting terminal 75 is joined to a cable conductor 81 of the cable main body 71 by compression. The connecting terminal 75 is located inside the housing portion 74 (fit tubular portion 77) and includes a compressed portion having an annular shape and a tip end portion having a plate shape. The insulating plug 84 includes an insulating plug main body 84a, a fixing embedded metal fitting 84b, and a work embedded metal fitting 84c. The insulating plug main body 84a is made of a hard insulating body, such as epoxy resin. The fixing embedded metal fitting 84b which is made of metal is embedded in the insulating plug main body 84a such that a tip end surface thereof is exposed at a tip end side of the insulating plug main body 84a. The work embedded metal fitting 84c which is made of metal is embedded in the insulating plug main body 84a such that a rear end portion thereof is exposed at a rear end side (a side where the cap portion 76 is attached) of the insulating plug main body 84a. A groove for accommodating a nut member 83 and an internal thread for fixing an external thread member 82 are formed at a tip end portion of the fixing embedded metal fitting 84b. After the insulating plug 84 is fitted to the work opening portion 80 of the fit tubular portion 77, the cap portion 76 is attached to close the work opening portion 80. Both the cap portion 76 and the insulating plug 84 are detachable. Each of the housing portion 74 and the cap portion 76 is made of an elastic insulating material. In a state where the plate-shaped tip end portion of the connecting terminal 75 is exposed in the accommodating portion 73 of the fit tubular portion 77, the cable main body 71 and the cable connector portion 72 are integrally fixed to each other. The foregoing has explained the respective components of the high voltage device system 100 according to the present embodiment.

In the foregoing, the projecting directions of the joint connector portions 55 of the joint devices 51 to 53 have been specifically explained. However, the projecting directions of the joint connector portions 55 are not limited to the above directions. For example, four joint connector portions 55 of the X joint device 51 may be configured to project in different directions.

Connecting Method

Figure 5:
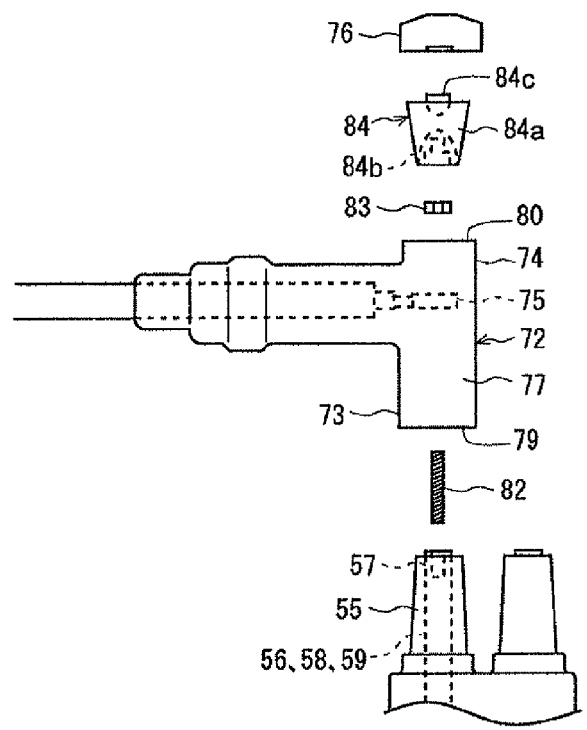
FIG. 5 is an exploded view showing the vicinity of a joint connector portion and cable connector portion according to the embodiment of the present invention.

Next, the method of connecting the high-voltage cables 70 to the joint devices 51 to 53 will be explained in reference to FIG. 5. FIG. 5 is an exploded view showing the vicinity of the joint connector portion 55 and cable connector portion 72 according to the present embodiment. Here, the X branch joint device 51, the Y branch joint device 52, and the straight joint device 53 respectively include the joint connector portions 55 that are the same in configuration as one another, and the high-voltage cables 70 are connected to the respective joint devices 51 to 53 via the joint connector portions 55 in accordance with the same method. Therefore, the method of connecting the high-voltage cables 70 to the joint devices 51 to 53 will be explained as follows regardless of the types of the joint devices 51 to 53.

First, the external thread member (stud) 82 is attached to the joint device 51, 52, or 53. Specifically, the external thread member 82 made of metal is threadedly engaged with the internal thread 57 formed at the tip end portion of the internal conductor portion 56, 58, or 59 of the joint device 51, 52, or 53. The length of the external thread member 82 is larger than the depth of the internal thread 57 formed at the internal conductor portion 56, 58, or 59. Therefore, in a case where one end of the external thread member 82 is threadedly engaged with the internal thread 57, a part of the other end of the external screw member 82 projects from the joint connector portion 55.

Next, the cable connector portion 72 is fitted to the joint connector portion 55. A direction in which the housing portion 74 of the cable connector portion 72 is fitted to the joint connector portion 55 is not a longitudinal direction of the high-voltage cable 70 but a direction substantially perpendicular to the longitudinal direction of the high-voltage cable 70. More specifically, the joint connector portion 55 is accommodated in the accommodating portion 73 of the fit tubular portion 77 in such a manner that the housing portion 74 covers the tip end of the joint connector portion 55. At this time, the external thread member 82 projecting from the joint connector portion 55 is caused to penetrate through a through hole 75a of the connecting terminal 75 that has been fixed in advance so as to be exposed to the inside of the accommodating portion 73 of the fit tubular portion 77.

Next, the nut member 83 made of metal is inserted through the work opening portion 80 formed in the fit tubular portion 77 of the housing portion 74. To fix the connecting terminal 75 to the internal conductor portion 56, 58, or 59, the nut member 83 is tightened on the external thread member 82 having penetrated through the connecting terminal 75. Then, the insulating plug 84 is attached. Since this work can be performed through the work opening portion 80, the work efficiency is extremely high.

Finally, the cap portion 76 is fitted to the work opening portion 80 to close the work opening portion 80. With this, the high-voltage cable 70 and the joint device 51, 52 or 53 are connected to each other. As above, the high voltage device system 100 according to the present embodiment is configured such that the high-voltage cables 70 are attached to the joint devices 51 to 53 by fitting the cable connector portion 72 to the joint connector portion 55 in a direction substantially perpendicular to the longitudinal direction of the high-voltage cable 70. Therefore, the work performed in the case of the conventional prefabricated joint, that is, the work of pulling back the high-voltage cable 70 in the longitudinal direction is unnecessary. Thus, the high-voltage cables 70 can be easily connected to the joint devices 51 to 53. In the case of the conventional prefabricated joint, the weight of the high voltage device system of the railcar is large due to, for example, a metal compression unit for pressing a stress-relief cone against a receiving opening. However, by adopting a connector type joint in which the number of parts is small as in the present embodiment, for example, the compression unit that is large in weight as in the case of the prefabricated joint is unnecessary. Thus, the weight of the high voltage device system of the railcar can be reduced. Therefore, the weight of the railcar can be reduced.

Wiring

Figure 6:
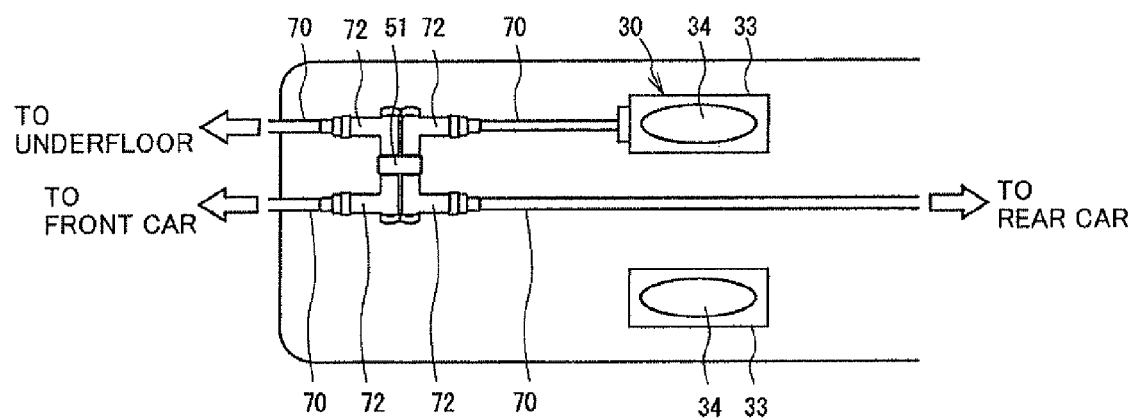
FIG. 6 is a plan view showing the vicinity of a power collector according to the embodiment of the present invention and a diagram in which a collector shoe and arm portion of the power collector are omitted.

Next, the wiring of the high-voltage cables 70 around the X branch joint device 51 in the railcar will be explained in reference to FIG. 6. Here, FIG. 6 is a plan view showing the vicinity of the power collector 30 according to the present embodiment and is a diagram in which the collector shoe 31 and arm portion 32 of the power collector 30 are omitted. As shown in FIG. 6, the cable connector portion 72 of the high-voltage cable 70 extending toward the power collector 30 is fitted to the first joint connector portions 55a located on a right rear side among the four joint connector portions 55 of the X branch joint device 51. The cable connector portion 72 of the high-voltage cable 70 extending through the fifth car 15 to be connected to the breaker 40 of the sixth car 16 is fitted to the second joint connector portions 55b located on a left rear side. The cable connector portion 72 of the high-voltage cable 70 extending through a front surface of the fourth car 14 to be connected to the breaker 40 arranged under the floor of the fourth car 14 is fitted to the first joint connector portions 55a located on a right front side. The cable connector portion 72 of the high-voltage cable 70 extending through the third car 13 to be connected to the breaker 40 of the second car 12 is fitted to the second joint connector portions 55b located on a left front side. As can be understood from the above configuration, in the present embodiment, in order to supply the electric power obtained by the power collector 30 to the motors 18 through the breakers 40 mounted on the second car 12, the fourth car 14, and the sixth car 16, the high-voltage cable 70 extending from the power collector is branched (is triply branched) at the X branch joint device 51 into three high-voltage cables 70.

Figure 7:
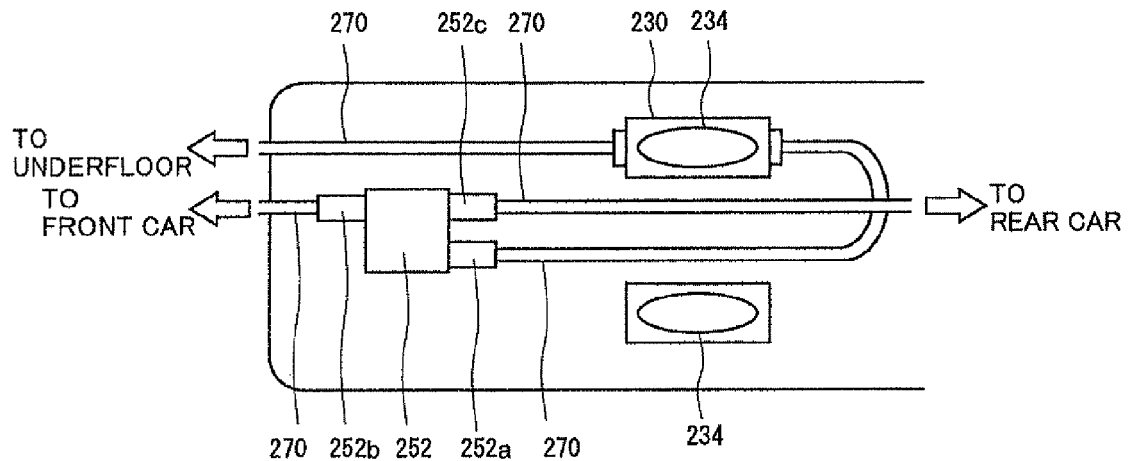
FIG. 7 is a plan view showing the vicinity of a power collector in a conventional high voltage device system and is a diagram in which a collector shoe and arm portion of the power collector are omitted.
Figure 8A:
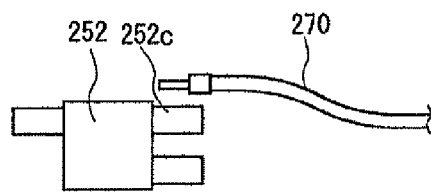
FIGS. 8A to 8C are diagrams showing one example of a method of connecting a high-voltage cable to a joint device in a conventional high voltage device system.
Figure 8B:
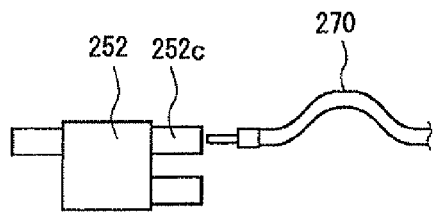
Figure 8C:
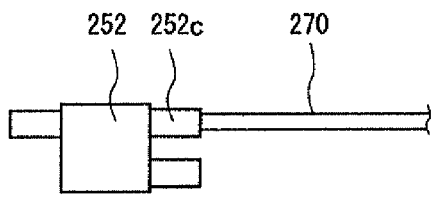

The following will compare FIG. 6 with FIG. 7 corresponding to FIG. 6 and showing a conventional case. In the conventional case, two high-voltage cables 270 extend from the power collector 230. However, in the present embodiment, one high-voltage cable 70 extends from the power collector 30.

As above, when wiring the conventional high-voltage cables, the Y branch joint device 252 that is a two-branch prefabricated joint is used. Therefore, to supply the electric power from the power collector 230 to three places, two high-voltage cables 270 need to be respectively arranged at the front and rear sides of the power collector 230. Therefore, conventionally, one of two high-voltage cables 270 needs to be arranged so as to U-turn. On this account, a space corresponding to a bending radius of the high-voltage cable 270 for the U-turn and a space for the work of pulling back the high-voltage cable 270 when assembling the prefabricated joint need to be secured. Further, the high-voltage cable 270 needs to be increased in length for the U-turn. However, by using the X branch joint device 51 as in the present embodiment, it becomes unnecessary to cause the high-voltage cable 70 to U-turn, so that the high-voltage cable can be shortened.

Further, according to the joint devices 51 to 53 of the present embodiment, the high-voltage cables 70 can be connected to the joint devices 51 to 53 without pulling back the high-voltage cables 70 in the longitudinal direction. Therefore, even if the extra lengths of the high-voltage cables 70 are short, the high-voltage cables 70 can be connected to the joint devices 51 to 53. Therefore, it is unnecessary to lengthen the high-voltage cable 270 between the power collector 230 and the joint device 252 beyond necessity, and it is also unnecessary to wire the high-voltage cable 270 with the large bending radius as shown in FIG. 7. To be specific, in a case where the electric power is supplied from the power collector 30 to three places, and the joint device is located in the vicinity of the power collector 30 as shown in FIG. 6, the X branch joint device 51 according to the present embodiment is used as the joint device. With this, the high-voltage cable 70 can be made shorter than the conventional cable. Therefore, the weight of the high voltage device system 100 of the railcar can be reduced by the reduction in length of the high-voltage cable 70. In addition, instead of the conventional prefabricated joint which requires the stress-relief cone compression unit made of metal and in which the number of parts is large, by applying the connector type joint in which the number of parts is small and which is lightweight to the railcar, the high voltage device system 100 of the railcar can be significantly reduced in weight.

Next, the wiring of the high-voltage cables 70 around the Y branch joint device 52 will be explained in reference to FIG. 3. To be specific, the cable connector portion 72 of the high-voltage cable 70 connected to the breaker 40 arranged under the floor of the sixth car 16 is fitted to the third joint connector portion 55c located on a right front side among three joint connector portions 55 of the Y branch joint device 52. The cable connector portion 72 of the high-voltage cable 70 extending through the fifth car 15 to be electrically connected to the X branch joint device 51 of the fourth car 14 is fitted to the fourth joint connector portion 55d located on a left front side. The high-voltage cable 70 is not connected to the third joint connector portion 55c located on a right rear side. As above, the high-voltage cables 70 (cable connector portions 72) are not necessarily connected to all the joint connector portions 55. Therefore, the Y branch joint device 52 of the sixth car 16 may be replaced with the X branch joint device 51. In this case, for example, the high-voltage cables 70 may not be connected to the joint connector portions 55 located on a right rear side and a left rear side, and those unused joint connector portions 55 may be closed by, for example, insulating caps.

The foregoing has explained the embodiment of the present invention in reference to the drawings. However, the specific configurations are not limited to the above embodiment. Design modifications and the like may be made within the spirit of the present invention. For example, the present embodiment has explained the housing portion 74 having a T shape. However, the housing portion may have an L shape that does not include the work opening portion 80, that is, does not require the insulating plug 84.

In the present embodiment, the number of cars of the railcar is seven. However, the number of cars may be seven or more or seven or less. The power collector, the breaker, and the transformer have been explained as examples of the high voltage devices. However, design modifications, such as the number of high voltage devices, the types of the high voltage devices, the locations of the high voltage devices, the number of joint devices, the types of the joint devices, and the locations of the joint devices, may be made in the present invention. For example, the present invention also includes a case where both the joint device according to the present invention and the conventional joint device are used in the high voltage device system.

INDUSTRIAL APPLICABILITY

According to the high voltage device system of the railcar of the present invention, the high-voltage cable can be efficiently connected to the joint device even in a limited space, such as a space on the roof of the railcar. Therefore, the present invention is useful in a technical field of the high voltage device system of the railcar.

REFERENCE SIGNS LIST

- 10 railcar
- 18 motor
- 19 drive wheel
- 30 power collector
- 40 breaker
- 51 X branch joint device
- 52 Y branch joint device
- 53 straight joint device
- 55 joint connector portion
- 55a first joint connector portion
- 55b second joint connector portion
- 55c third joint connector portion
- 55d fourth joint connector portion
- 55e fifth joint connector portion
- 70 high-voltage cable
- 72 cable connector portion
- 73 accommodating portion
- 74 housing portion
- 75 connecting terminal
- 76 cap portion
- 77 fit tubular portion
- 78 base tubular portion
- 80 work opening portion
- 81 cable conductor
- 84 insulating plug
- 100 high voltage device system

The invention claimed is:

1. A high voltage device system for use with a railcar and at least one overhead contact line, the high voltage device system comprising:
   a plurality of high voltage devices to which high-voltage electric power from the at least one overhead contact line is supplied;
   a plurality of high-voltage cables configured to connect the high voltage devices with one another; and
   a joint device to which the high-voltage cables are connected, wherein:
   the high-voltage cables respectively each include cable connector portions at tip end portions of the high-voltage cables, each of the cable connector portions including: (i) a base tubular portion configured to cover the high-voltage cable, and (ii) a fit tubular portion extending from the base tubular portion in a direction substantially perpendicular to a longitudinal direction of the high-voltage cable;
   the joint device includes joint connector portions, each of which is fitted to the fit tubular portion of the cable connector portion to be connected to the high-voltage cable; and
   the joint connector portions of the joint device are four projecting joint connector portions.

2. The high voltage device system of the railcar according to claim 1, wherein:
   the four joint connector portions are two first joint connector portions projecting toward one side in the substantially railcar width direction and two second joint connector portions projecting toward the other side in the substantially railcar width direction;
   the first joint connector portions are respectively arranged on front and rear sides in a railcar longitudinal direction; and
   the second joint connector portions are respectively arranged on front and rear sides in the railcar longitudinal direction.

3. The high voltage device system of the railcar according to claim 2, wherein:
   the high-voltage cable extending from one of the high voltage devices is connected to one of the first joint connector portions; and
   the electric power supplied from the high-voltage cable is supplied to the other first joint connector portion and the two second joint connector portions.

4. The high voltage device system of the railcar according to claim 2, wherein:
   the high voltage device system is applicable to the railcar including a bogie arranged under a floor thereof;
   the high voltage devices include a power collector arranged at a substantially center of the bogie and on the roof of the railcar and configured to collect the electric power from the at least one overhead contact line;
   the joint device is arranged so as to be located closer to an end portion in the railcar longitudinal direction than the power collector;
   the cable connector portion of the high-voltage cable extending from the power collector is connected to one of the first joint connector portions; and
   the electric power supplied from the high-voltage cable through the power collector is supplied to the other first joint connector portion and the two second joint connector portions.

5. The high voltage device system of the railcar according to claim 4, wherein:
   the high voltage device system is applicable to the railcar including a plurality of cars;
   the cable connector portion of the high-voltage cable extending from the power collector is connected to one of the first joint connector portions; and the high voltage devices other than the power collector are connected to the other first joint connector portion and the two second joint connector portions; and at least one of the high voltage devices other than the power collector is arranged under a floor of the car other than the car including the power collector.

6. A high voltage device system for use with a railcar and at least one overhead contact line, the high voltage device system comprising:
 a plurality of high voltage devices to inch high-voltage electric power from the at least one overhead contact line is supplied;
 a plurality of high-voltage cables configured to connect the high voltage devices with one another; and
 a joint device to which the high-voltage cables are connected. wherein:
 the high-voltage cables respectively each include cable connector portions at tip end portions of the high-voltage cables, each of the cable connector portions including: (i) a base tubular portion configured to cover the high-voltage cable, and (ii) a fit tubular portion extending from the base tubular portion in a direction substantially perpendicular to a longitudinal direction of the high-voltage cable;
 the joint device includes joint connector portions, each of which is fitted to the fit tubular portion of the cable connector portion to be connected to the high-voltage cable;
 the joint connector portions of the joint device are two third joint connector portions projecting toward one side in a substantially railcar width direction and one fourth joint connector portion projecting toward the other side in the substantially railcar width direction; and
 the third joint connector portions are respectively arranged on front and rear sides in a railcar longitudinal direction.

7. A high voltage device system for use with a railcar and at least one overhead contact line, the high voltage device system comprising:
 a plurality of high voltage devices to which high-voltage electric power from the at least one overhead contact line is supplied;
 a plurality of high-voltage cables configured to connect the high voltage devices with one another, and
 a joint device to which the high-voltage cables are connected, wherein:
 the high-voltage cables respectively each include cable connector portions at tip end portions of the high-voltage cables, each of the cable connector portions including: (i) a base tubular portion configured to cover the high-voltage cable, and (ii) a fit tubular portion extending from the base tubular portion in a direction substantially perpendicular to a longitudinal direction of the high-voltage cable;
 the joint device includes joint connector portions, each of which is fitted to the fit tubular portion of the cable connector portion to be connected to the high-voltage cable;
 each of the cable connector portions further includes a connecting terminal located inside the fit tubular portion and coupled to a cable conductor of the high-voltage cable;
 the joint device includes an internal conductor portion exposed from tip ends of the respective joint connector portions;
 in a state where the joint connector portions are fitted to the cable connector portions, the connecting terminals of the cable connector portions are electrically connected to the internal conductor portion at the joint connector portions; and
 a work opening portion for connecting the connecting terminal and the internal conductor portion is formed at one side of the fit tubular portion of the cable connector portion, said one side is opposite to a portion in which the joint connector portion is accommodated.

8. The high voltage device system of the railcar according to claim 7, wherein the cable connector portion includes an insulating plug configured to close the work opening portion.

9. A railcar for use with at least one overhead contact line, the railcar comprising:
 high voltage devices that are a power collector configured to collect high-voltage electric power from the at least one overhead contact line, a breaker configured to break a circuit when a predetermined current or a current higher than the predetermined current from the power collector flows therethrough, and a transformer configured to transform a voltage of the current having flowed through the breaker;
 a plurality of high-voltage cables configured to connect the high voltage devices with one another; and
 a joint device to which the respective high-voltage cables are connected, wherein:
 the high-voltage cables respectively include cable connector portions at tip end portions thereof, each of the cable connector portions including a base tubular portion configured to cover the high-voltage cable and a fit tubular portion extending from the base tubular portion in a direction substantially perpendicular to a longitudinal direction of the high-voltage cable;
 the joint device includes joint connector portions, each of which is fitted to the fit tubular portion of the cable connector portion to be connected to the high-voltage cable; and
 the joint connector portions of the joint device are four projecting joint connector portions.

10. A railcar for use with at least one overhead contact line, the railcar comprising:
 high voltage devices that are a power collector configured to collect high-voltage electric power from the at least one overhead contact line, a breaker configured to break a circuit when a predetermined current or a current higher than the predetermined current from the power collector flows therethrough, and a transformer configured to transform a voltage of the current having flowed through the breaker;
 a plurality of high-voltage cables configured to connect the high voltage devices with one another; and
 a joint device to which the respective high-voltage cables are connected, wherein:
 the high-voltage cables respectively include cable connector portions at tip end portions thereof, each of the cable connector portions including a base tubular portion configured to cover the high-voltage cable and a fit tubular portion extending from the base tubular portion in a direction substantially perpendicular to a longitudinal direction of the high-voltage cable;
 the joint device includes joint connector portions, each of which is fitted to the fit tubular portion of the cable connector portion to be connected to the high-voltage cable;
 the joint connector portions of the joint device are two third joint connector portions projecting toward one side in a substantially railcar width direction and one fourth joint connector portion projecting toward the other side in the substantially railcar width direction; and the third joint connector portions are respectively arranged on front and rear sides in a railcar longitudinal direction.

11. A railcar for use with at least one overhead contact line, the railcar comprising:

high voltage devices that are a power collector configured to collect high-voltage electric power from the at least one overhead contact line, a breaker configured to break a circuit when a predetermined current or a current higher than the predetermined current from the power collector flows therethrough, and a transformer configured to transform a voltage of the current having flowed through the breaker;

a plurality of high-voltage cables configured to connect the high voltage devices with one another; and a joint device to which the respective high-voltage cables are connected, wherein:

the high-voltage cables respectively include cable connector portions at tip end portions thereof, each of the cable connector portions including a base tubular portion configured to cover the high-voltage cable and a fit tubular portion extending from the base tubular portion in a direction substantially perpendicular to a longitudinal direction of the high-voltage cable;

the joint device includes joint connector portions, each of which is fitted to the fit tubular portion of the cable connector portion to be connected to the high-voltage cable;

each of the cable connector portions further includes a connecting terminal located inside the fit tubular portion and coupled to a cable conductor of the high-voltage cable;

the joint device includes an internal conductor portion exposed from tip ends of the respective joint connector portions;

in a state where the joint connector portions are fitted to the cable connector portions, the connecting terminals of the cable connector portions are electrically connected to the internal conductor portion at the joint connector portions; and a work opening portion for connecting the connecting terminal and the internal conductor portion is formed at one side of the fit tubular portion of the cable connector portion, said one side is opposite to a portion in which the joint connector portion is accommodated.

* * * * *